R. P. BROWN AND C. P. FREY.
SCALE MECHANISM FOR ELECTRICAL MEASURING INSTRUMENTS.
APPLICATION FILED JAN. 6, 1919.
1,320,119.
Patented Oct. 28, 1919.
3 SHEETS—SHEET 1.
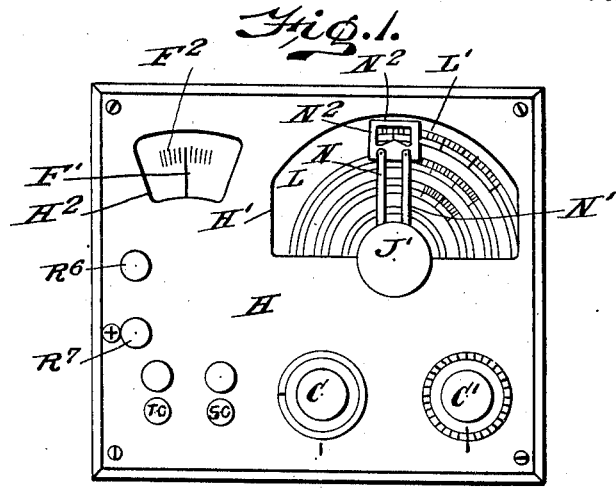
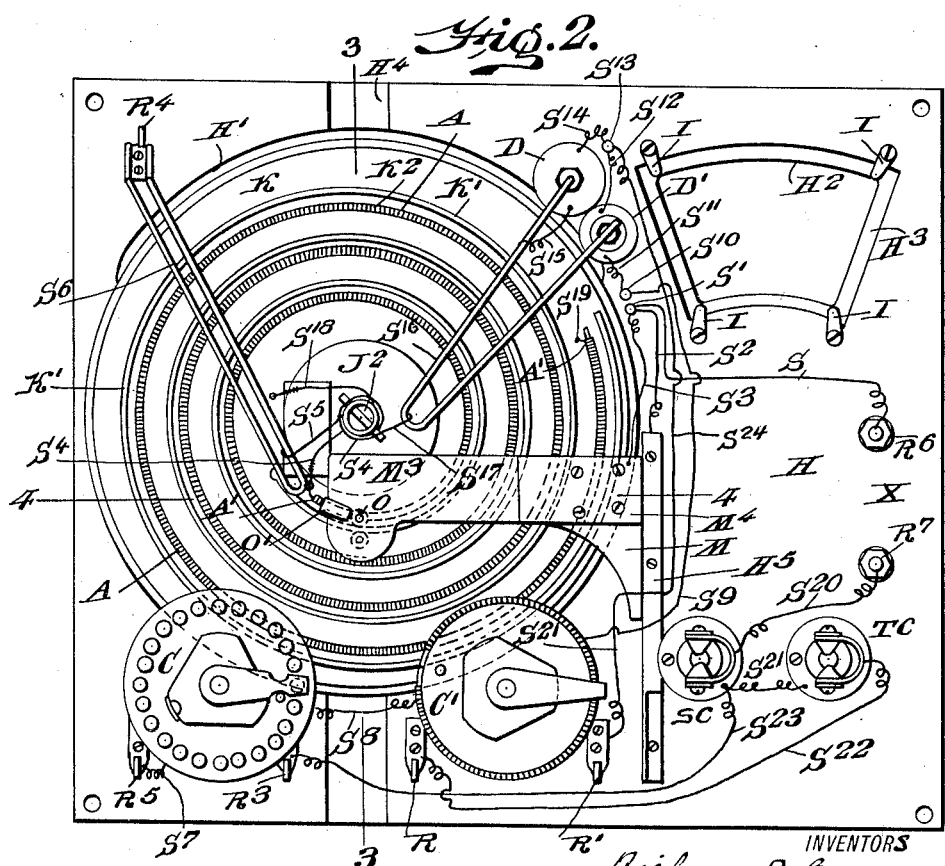
INVENTORS
Richard P. Brown
Charles P. Frey
BY
Francis J. Chambers
their ATTORNEY.

R. P. BROWN AND C. P. FREY.
SCALE MECHANISM FOR ELECTRICAL MEASURING INSTRUMENTS.
APPLICATION FILED JAN. 6, 1919.
1,320,119.
Patented Oct. 28, 1919.
3 SHEETS—SHEET 2.
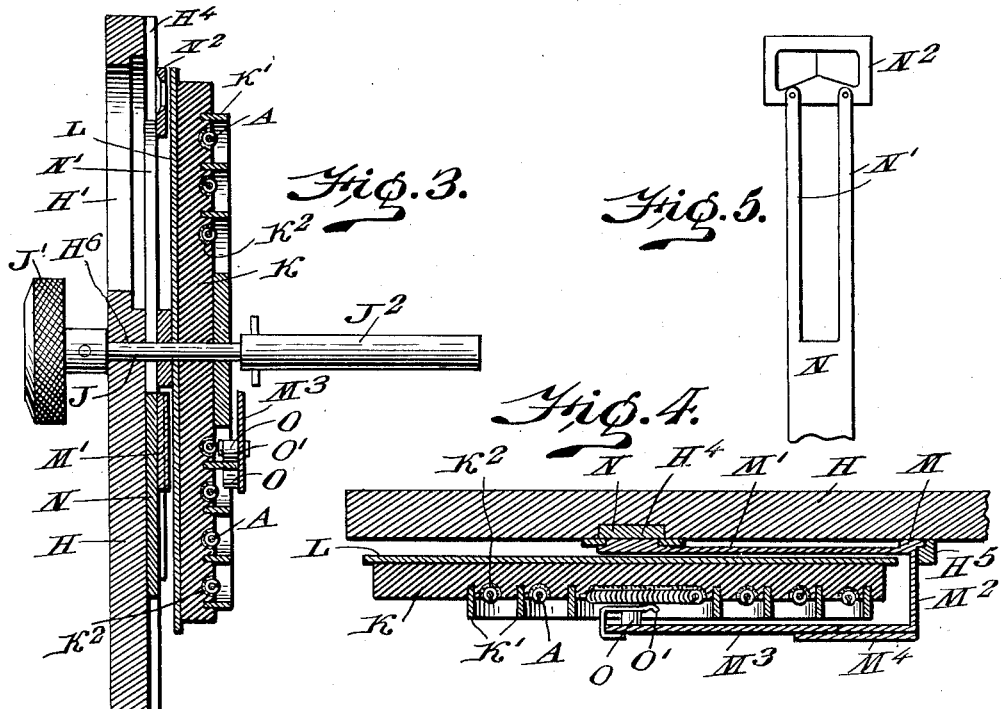
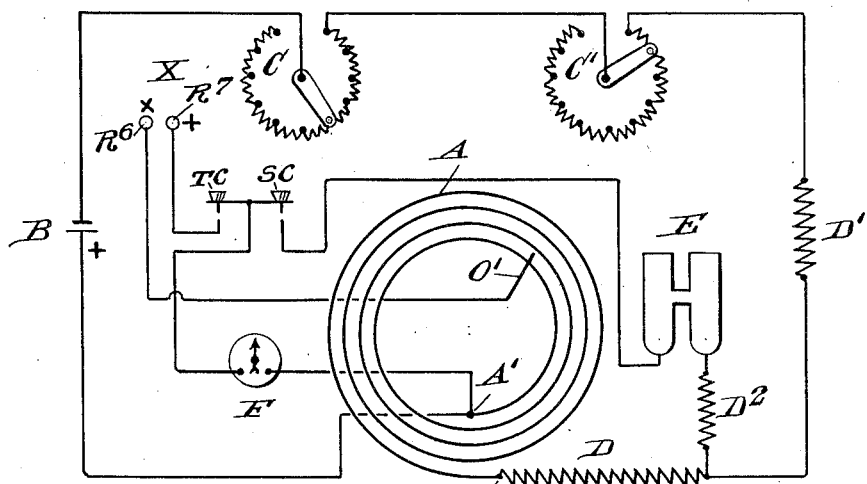
INVENTORS.
Richard P. Brown
Charles P. Frey
BY
Francis J. Chambers
their ATTORNEY.

R. P. BROWN AND C. P. FREY.
SCALE MECHANISM FOR ELECTRICAL MEASURING INSTRUMENTS.
APPLICATION FILED JAN. 6, 1919.
1,320,119.  Patented Oct. 28, 1919.
3 SHEETS—SHEET 3.
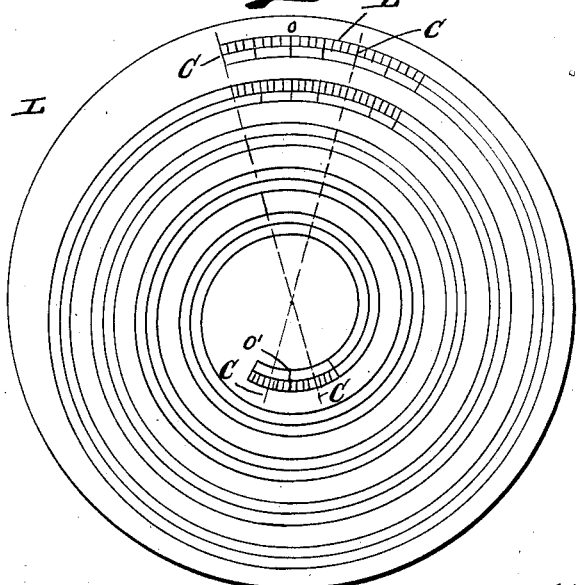
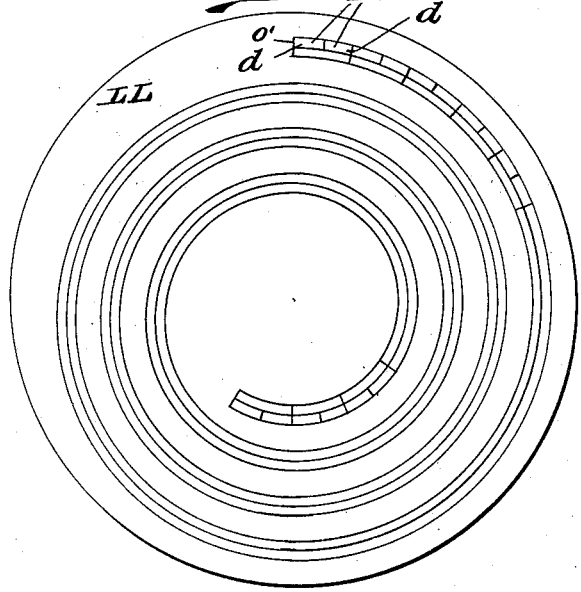
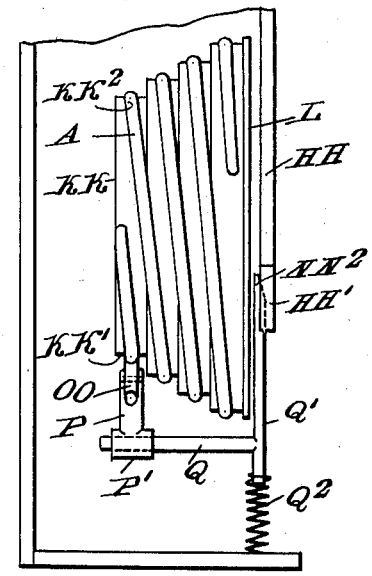
INVENTORS
Richard P. Brown
Charles P. Frey
BY
their ATTORNEY.

UNITED STATES PATENT OFFICE.

RICHARD P. BROWN AND CHARLES P. FREY, OF PHILADELPHIA, PENNSYLVANIA, ASSIGNORS TO THE BROWN INSTRUMENT COMPANY, OF PHILADELPHIA, PENNSYLVANIA, A CORPORATION OF PENNSYLVANIA.

SCALE MECHANISM FOR ELECTRICAL MEASURING INSTRUMENTS.

1,320,119.   Specification of Letters Patent.   Patented Oct. 28, 1919.

Application filed January 6, 1919. Serial No. 269,760.

*To all whom it may concern:*

Be it known that we, RICHARD P. BROWN and CHARLES P. FREY, citizens of the United States of America, and residents of the city and county of Philadelphia, in the State of Pennsylvania, have invented certain new and useful Improvements in Scale Mechanism for Electrical Measuring Instruments, of which the following is a true and exact description, reference being had to the accompanying drawings, which form a part thereof.

Our invention relates to scale mechanism for electrical measuring instruments involving a rheostat consisting of a resistance wire and a movable element for determining the potential between two points on said wire. Primarily our invention is designed for use in connection with the rheostat in the form of what is called the slide wire in instruments known as potentiometers.

The object of our invention is to provide and make practicable the use of a long scale occupying a small and compact space in connection with such instruments, and, broadly speaking, our invention consists in providing the instrument with a rotatable supporting base for the slide wire, on which the slide wire coiled in the form of a volute is secured, in providing further a rotatable scale plate, rotating synchronously with the base, on which is formed a volute scale, and in providing a radially movable index moving over the scale and actuated synchronously with the rotative movements of the base. The nature of our invention will be best understood as described in connection with the drawings which illustrate it in what we believe to be its best form of application and in which—

Figure 1 is a top view of the face of a potentiometer instrument embodying our invention.

Fig. 2 is a view of the same plate from the main side shown on a larger scale and exhibiting the mechanism attached to it.

Fig. 3 is a sectional view on the line 3—3 of Fig. 2.

Fig. 4 is a sectional view on line 4—4 of Fig. 2.

Fig. 5 is a face view of the radially movable index with its lower end and attachments broken away.

Fig. 6 is a diagrammatic showing of the potentiometer as a whole.

Fig. 7 is a face view of a volute scale suitable for use in our instrument.

Fig. 8 is a face view of an alternative volute scale, and

Fig. 9 is a side elevation of a modified form of instrument also involving our invention.

Referring first to the diagram Fig. 6 A indicates the slide wire of the potentiometer which we have shown as coiled in the form of a volute, A′ and A² indicating the ends of the wire; B is the usual small dry cell current from which is continuously passing through the slide wire from A′ to A², the resistors D and D′, and the rheostats C and C′. E indicates a standard cell which is ballasted with a resistor D². The + side of the cell is connected through the standard cell key SC with a galvanometer F and the zero end A′ of the slide wire. R⁶ and R⁷ are the binding posts to which the source of potential to be tested is connected and connected in circuit through the key TC and the slider O′ which is movable over the slide wire, and by moving which the E. M. F. of the source of potential is determined.

In all the indicated and described features of construction and operation the potentiometer indicated in the diagram is of an old and familiar construction save only in the use of the volute slide wire.

Referring now to Figs. 1 to 6 A indicates the slide wire which is here shown as spirally coiled about a nonconducting core, the coils being insulated from each other, but the insulation being removed along one side of the spiral coil so that the slider can make contact with the wire as it passes over the coil. This is a well known form of construction. H is the face plate of the instrument formed, as shown, with an opening H′ through which the scale and index are observed and an opening H² for the galvanometer scale, a seat H³ is formed around opening $H^2$ for a glass and clip I, I, are provided to hold the glass in its seat. $H^4$ is a guide slot formed on the under side of the plate, and $H^5$ a parallel guideway secured to the plate, and $H^6$ is a bearing for the shaft J, which is provided with a hand wheel J' on the outside of the plate H, and has a drum $J^2$ formed on or attached to its inner end. K is the rotatable base plate for the slide wire formed, as shown, with a volute groove $K^2$ on its under face in which the volutely coiled slide wire A is held with a volutely formed guideway K'. To the upper side of the plate K is attached the scale plate L on which is inscribed the volute scale indicated at L'.

M is a slide guided in guideway $H^5$ and rigidly connected through plate M' with the slide N moving in guideway $H^4$. The slide N, as shown, is connected by arms N' with the index head $N^2$. The slide M is connected by a rigid arm $M^2$ with the plate $M^3$, which extends under the rotatable base K, $M^4$ indicating a strengthening plate. To the end of plate $M^3$ are secured guide rollers O, O, extending on each side of the volute guide plate K' and also the slider O', which presses against the noninsulated face of the slide wire A.

It will be obvious that as the base K is revolved the volute guideway K', acting on rollers O, O, will cause the plate $M^3$ to move radially to and from the center of the base and that a corresponding radial movement over the revolving volute scale will be imparted to the connected index head $N^2$. Also it is obvious that the position of the index on the scale will correspond with or bear a fixed relation to the position of the slider on the volute slide wire.

There are two alternative ways of setting the instrument and inscribing the scale on the scale plate each having advantages. Thus if the slider is located approximately beneath the index, or so that it will rest at a zero point on the volute slide wire, say at its outer end, when the index is at the zero point on the scale located also at the corresponding end of the volute scale, the scale divisions will be equal to each other, as shown in Fig. 8 at L' on scale plate indicated at L, L, each scale division $d, d$ being equal in length to the others. With this scale the slider O' will rest at a zero point on the slide wire at a point o' beneath and corresponding to the zero point on the scale when the index registers with said zero point.

The alternative scale indicated at L', Fig. 7, is designed for use with the slider resting on a zero point indicated at o' at the inner end of the slide wire when the index registers with a zero point at the outer end of the volute scale, and in this construction the scale divisions c, c, will be progressively smaller from zero on.

In Fig. 9 we have illustrated a modification of our previously described construction in which the slide wire A in place of being wound in a true volute on a flat base plate is wound in what we may call a spiral volute on a fusee barrel indicated at KK, the wire being held in a spiral volute groove $KK^2$ on the barrel, which also may form a spiral volute guideway KK', or the wire may itself serve as a guideway. L is the scale plate and $NN^2$ the radially movable index which, in this construction, is secured to a slide Q' pressed inward by a spring $Q^2$ and having secured to it an arm Q extending over the fusee base plate and having sliding thereon a head P' from which extends an arm P supporting a trolley wheel OO, which runs on the coiled slide wire, as shown. This construction is an obvious equivalent for that previously described.

Referring to the detailed constructions of Figs. 1 to 4, C and C' are the rheostats employed in such instruments as indicated in the diagram Fig. 6. $R^6$ and $R^7$ are the binding posts to which is to be connected the source of the potential to be measured. TC and SC are press button switches by which the test cell or standard cell are connected in circuit as shown in the diagram. R and R' are terminals to be connected with the standard cell as shown in the diagram. $R^3$ is a terminal to be connected to the galvanometer F of the diagram. $R^4$ and $R^5$ are terminals to connect with the battery B of the diagram.

The circuit wires of Fig. 2 may be followed, beginning with binding post $R^6$. S is a wire leading to a post $S^7$ from which lead wires $S^2$ and $S^3$ connecting to guide $H^5$ and plate $M^4$, the circuit passing through plate $M^3$ and slider O' to the slide wire A. From the inner end of the slide wire a wire $S^4$ leads, and forming a loose coil on sleeve $J^2$ connects through wire $S^5$ with the wire arm $S^6$ which connects to terminal $R^4$. From terminal $R^5$ a wire $S^7$ connects to rheostat C from which wire $S^8$ leads to rheostat C' from which in turn wire $S^9$ leads to post $S^{10}$ from which wire $S^{11}$ leads to resistance spool D', from which wire $S^{12}$ leads to post $S^{13}$ connecting through wire $S^{14}$ to resistance spool D, and through wires $S^{24}$ to terminal R'. From spool D wire $S^{15}$ connects to wire frame $S^{16}$, from which leads a wire $S^{17}$ loosely coiled about sleeve $J^2$ and connecting through wires $S^{18}$ and $S^{19}$ with the outer end of the slide wire at A'. Other circuit wires shown in Fig. 2 are $S^{20}$, leading from binding post $R^7$ to switch SC, from which a wire $S^{23}$ leads to terminal $R^3$, and another wire $S^{21}$ to switch TC, from which wire $S^{22}$ leads to terminal R.

Of course, the exact wiring shown may be varied at will so long as the circuits are arranged as shown in the diagram where our invention is applied to a potentiometer of the kind indicated there, or in any other convenient way where our invention is applied to other forms of rheostat instruments.

Having now described our invention, what we claim as new and desire to secure by Letters Patent, is:

1. In an electrical measuring instrument a rheostat consisting of a resistance wire wound in the form of a volute on a rotatable supporting base, in combination with a scale plate connected to rotate synchronously with the said base and having a volute scale upon it, a radially movable index and means actuated by the rotation of the base for moving the index over the scale.

2. In an electrical measuring instrument a rheostat consisting of a resistance wire wound in the form of a volute on a rotatable supporting base, in combination with a movable element for determining the potential between two points on said resistance wire, a scale plate connected to rotate synchronously with the said base and having a volute scale upon it, a radially movable index and means actuated by the rotation of the base for moving the index over the scale in a coördinated relation to the movements of the movable element over the resistance wire.

3. In an electrical measuring instrument a rotatable base in combination with a rheostat consisting of a resistance wire wound in the form of a volute on said base, a guideway also formed in volute form on said base, a scale plate connected to revolve synchronously with the base, a volute scale on said plate, an index radially movable over the scale, and means actuated by the volute guideway for moving the index in coördination with the movements of the rotatable base and scale plate.

4. In an electrical measuring instrument a rotatable base in combination with a rheostat consisting of a resistance wire wound in the form of a volute on said base, a guideway also formed in volute form on said base, a scale plate connected to revolve synchronously with the base, a volute scale on said plate, an index radially movable over the scale, an element radially movable over the rotatable base, actuated by the movements of the volute guideway, and an actuating connection between said means and the radially movable index.

RICHARD P. BROWN.
CHARLES P. FREY.